(12) United States Patent
Fisher et al.

(10) Patent No.: US 9,121,618 B2
(45) Date of Patent: Sep. 1, 2015

(54) DIRECT EVAPORATIVE AIR HANDLER

(71) Applicant: MUNTERS CORPORATION, Selma, TX (US)

(72) Inventors: Mark Thomas Fisher, Reston, VA (US); Bryan Keith Dunnavant, Lexington, VA (US); Michael S. Boucher, Lexington, VA (US)

(73) Assignee: MUNTERS CORPORATION, Selma, TX (US)

(*) Notice: Subject to any disclaimer, the term of this patent is extended or adjusted under 35 U.S.C. 154(b) by 190 days.

(21) Appl. No.: 13/909,616

(22) Filed: Jun. 4, 2013

(65) Prior Publication Data

US 2013/0320573 A1 Dec. 5, 2013

Related U.S. Application Data

(60) Provisional application No. 61/655,250, filed on Jun. 4, 2012.

(51) Int. Cl.
*B01F 3/04* (2006.01)
*F25D 17/06* (2006.01)
(Continued)

(52) U.S. Cl.
CPC ............ *F24F 6/02* (2013.01); *B01F 3/04085* (2013.01); *F24F 5/0035* (2013.01);
(Continued)

(58) Field of Classification Search
CPC .... B01F 3/04; B01F 3/04085; B01F 3/04007; B01F 3/04014; F25D 17/08; F25D 17/06; F24F 6/02
USPC .............. 261/26, 94, 97, 98, 115, 118, 127; 454/228, 233, 236; 62/91, 259.2, 259.4
See application file for complete search history.

(56) References Cited

U.S. PATENT DOCUMENTS 3,905,205 A 9/1975 Zusmanovich
4,506,514 A 3/1985 Lamar et al.
(Continued)

FOREIGN PATENT DOCUMENTS

EP         1 810 856 A2    7/2007
WO    WO 2006/035825 A1   4/2006

OTHER PUBLICATIONS

Jun. 11, 2014 Written Opinion issued in International Application No. PCT/US2013/044100.
(Continued)

*Primary Examiner* — Robert A Hopkins
(74) *Attorney, Agent, or Firm* — Oliff PLC

(57) ABSTRACT

A direct evaporative air handler for providing supply air to humidify and cool an enclosed space such as a data center. The air handler includes an evaporative cooler and a return air port that is positioned upstream of the evaporative cooler to allow recirculated air from the enclosed space to pass through the evaporative cooler. The air handler includes an additional return air port that is positioned downstream of the evaporative cooler to allow recirculated air from the enclosed space to bypass the evaporative cooler. The air handler includes an outdoor air port that is positioned upstream of the evaporative cooler to allow outdoor air to pass through the evaporative cooler and further includes an outdoor air bypass port that allows outdoor air to enter the air handler without passing through the evaporative cooler. The temperature and humidity of the supply air can be controlled under various ambient conditions by controlling the amount of air that enters the air handler through each port.

24 Claims, 5 Drawing Sheets

(51) Int. Cl.
  *F24F 6/02* (2006.01)
  *F25D 17/08* (2006.01)
  *F24F 5/00* (2006.01)
  *F24F 11/00* (2006.01)

(52) U.S. Cl.
  CPC .......... *F24F 11/0079* (2013.01); *F25D 17/06* (2013.01); *F25D 17/08* (2013.01); *Y02B 30/545* (2013.01); *Y02B 30/746* (2013.01)

(56) References Cited

U.S. PATENT DOCUMENTS

| | | |
|---|---|---|
| 5,727,394 A | 3/1998 | Belding et al. |
| 5,890,372 A | 4/1999 | Belding et al. |
| 8,151,578 B1 * | 4/2012 | Morales et al. .................. 62/91 |
| 2005/0056042 A1 | 3/2005 | Bourne et al. |

OTHER PUBLICATIONS

Sep. 18, 2014 Notification of Transmittal of the International Preliminary Report on Patentability issued in PCT Application No. PCT/US2013/0044100.

Aug. 19, 2013 International Search Report and Written Opinion issued in International Application No. PCT/US2013/044100.

* cited by examiner

DIRECT EVAPORATIVE AIR HANDLER

CROSS-REFERENCE TO RELATED APPLICATION

This application claims the benefit of provisional application 61/655,250, filed on Jun. 4, 2012 and entitled "Adiabatic Humidifier And Cooler," which is incorporated by reference herein in its entirety.

BACKGROUND

This disclosure relates generally to an air handler for conditioning an indoor space, and more specifically to a direct evaporative air handler that can provide supply air to cool and humidify the space under different ambient operating conditions. The air handler can be used to condition data centers that require relatively consistent supply air under different ambient conditions, i.e., even during cold during winter months and hot summer months.

Data centers are used to house electronic devices, such as servers and computer storage devices, which generate a significant amount of heat during operation. Direct evaporative air handlers are used to cool data centers by providing a relatively cooler supply air stream to the enclosed space in which the electronic equipment operates. Although the operating requirements for air handlers vary depending on the data center, in general, it is preferred that the air handler deliver supply air to the data center at a temperature of about 75° F. and a humidity in the range of about 25-80%. It can be difficult to control the temperature and humidity of the supply air using direct evaporative systems in some conditions because cooling outdoor air is accomplished with discrete evaporation steps, which can render the air too cool or too humid, for example. Additionally, in very cold weather when the air is dry, it can be difficult to humidify the outdoor air without freezing the evaporative media.

One approach to improve control of temperature and humidity parameters is to control the amount of the evaporation media that is wetted, so that, depending on the outdoor conditions, only a portion of the total media surface is wetted. This method may be configured in either series or parallel split media, and provides cooling in discrete stages. Control of the supply air conditions can be difficult even under this approach. For example, if a control signal is sent to stop wetting the media, the media will remain wet for a significant period (until all of the water has been evaporated) and continue to cool and humidify the outdoor air.

SUMMARY

An air handler is provided to humidify and cool an enclosed space, such as a data center, where the air handler can provide improved control of the supply air temperature and humidity under different ambient conditions.

In one aspect, a direct evaporative air handler is provided that can condition an enclosed space with supply air. The air handler includes an evaporative cooler, an outdoor air port, and a return air port. The outdoor air port can be positioned upstream of the evaporative cooler in an air flow direction, and can be configured to allow outdoor air to enter the air handler. The return air port can be positioned upstream of the evaporative cooler in an air flow direction, and can be configured to allow recirculated air from the enclosed space to enter the air handler. The air handler can be configured so that outdoor air entering the air handler through the outdoor air port passes through evaporative cooler, and so that the recirculated air entering the air handler through the return air port passes through the evaporative cooler.

In another aspect, an air handler is provided that includes an evaporative cooler, an outdoor air port, an outdoor air bypass port, a first return air port, a second return air port, and a supply fan. The outdoor air port can be positioned upstream of the evaporative cooler in an air flow direction, and can be configured to selectively allow outdoor air to enter the air handler and proceed on a flow path that passes through the evaporative cooler. The outdoor air bypass port can be configured to selectively allow outdoor air to enter the air handler and proceed on a flow path that does not pass through the evaporative cooler. The first return air port can be configured to selectively allow recirculated air from the enclosed space to enter the air handler and proceed on a flow path that does not pass through the evaporative cooler. The second return air port can be positioned upstream of the evaporative cooler in an air flow direction, and can be configured to selectively allow recirculated air from the enclosed space to enter the air handler and proceed on a flow path that passes through the evaporative cooler. The supply fan can be positioned downstream of the evaporative cooler, and can be configured to draw air through the outdoor air port, outdoor air bypass port, first return air port, and second return air port. The supply fan is configured to mix air in the air handler and provide the mixed air as the supply air.

In other aspects, methods of operating the air handler are provided by selectively controlling the air that is drawn through the several ports of the air handler.

BRIEF DESCRIPTION OF THE DRAWINGS

Exemplary embodiments are described in detail below with reference to the accompanying drawings in which.

DETAILED DESCRIPTION OF THE EMBODIMENTS

Figure 1A:
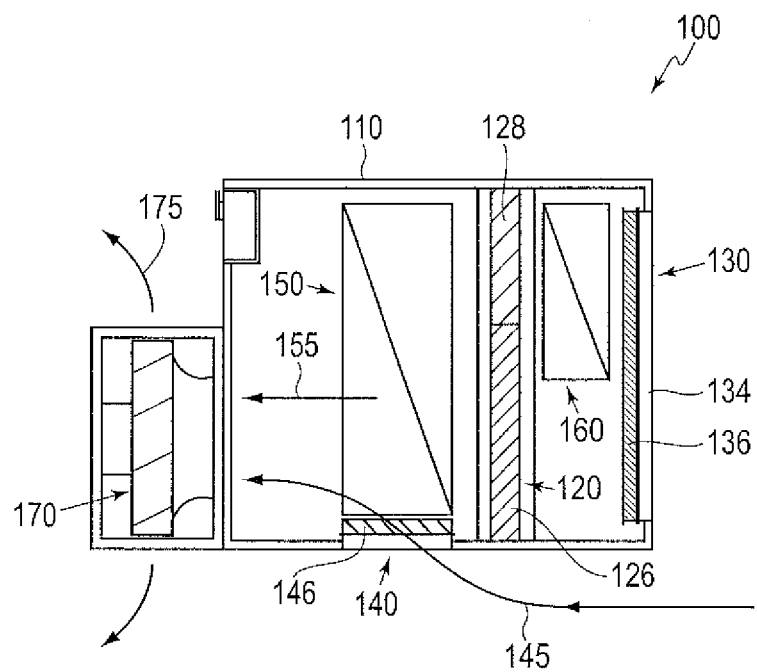
FIGS. 1A and 1B are respectively a plan view diagram and a side view diagram showing operation of an air handler in a first operation mode.

Exemplary embodiments of the broad principles outlined herein are described with reference to the various drawings.

The air handler and control system of the invention can use direct evaporative cooling to cool and humidify an enclosed space such a data center. The design described herein can provide a simple, complete and efficient method for cooling a data center while maintaining the humidity of the conditioned space within appropriate limits. Among other advantages, the air handler can achieve optimal energy efficiency, minimization of stratification of supply air, improved control of space temperature and humidity under a variety of different ambient conditions, and elimination of freeze risk during cold ambient operation.

FIGS. 1A-3B illustrate three operating modes of air handler 100. The air handler 100 includes housing 110, evaporative cooler 120 that is provided within housing 110, outdoor air intake port 130 formed on a rear or upstream side of housing 110, outdoor air bypass port 140 formed on a side of housing 110, first return air port 150 formed on the top side of housing 110, second return air port 160 formed on the top side of housing 110, and supply fan 170 that is positioned at a downstream draw-through position of the air handler 100. Building relief fans and/or dampers are typically used as part of a complete building conditioning system and are not shown as part of FIGS. 1A-3B.

The outdoor air intake port 130 is provided on the rear of housing 100 and is positioned upstream, in an air flow direction, of the evaporative cooler 120. The outdoor air flowing through port 130 proceeds on a flow path that passes through evaporative cooler 120. Port 130 is provided with a damper 134 that can control the amount of air that flows through port 130. The air handler 100 can also include air filter 136 that filters incoming outdoor air. The filters 136 may be installed before or after damper 134.

The outdoor air bypass port 140 is provided on the side of the housing 110 and is positioned downstream, in an air flow direction, of the evaporative cooler 120 so that air flowing through port 140 proceeds on a flow path that does not pass through evaporative cooler 120. The bypass port 140 can be positioned anywhere on the housing where the outdoor air coming through port 140 bypasses the evaporative cooler 120. Port 140 is similarly provided with damper 144 that can control the amount of air that flows through port 140. The air handler 100 can also be provided with air filter 146 to filter air entering through port 140. The filters 146 may be installed before or after damper 144. For indoor air handling installations, filters 136 and 146 may be eliminated and total incoming outdoor air may be filtered by a common filter bank prior to entry into ports 130 or 140.

The first return air port 150 allows air that is being returned or recycled from a conditioned space to be returned to the air handler 100. The temperature of return air for most data centers implemented with hot-aisle containment is between 85° F. and 105° F. The first return air port 150 is provided on the top side of housing 110 and is positioned downstream, in an air flow direction, of evaporative cooler 120 so that air flowing through port 150 proceeds on a flow path that does not pass through evaporative cooler 120. Here also, the first return air port 150 can be positioned anywhere on the housing 110 where the return air coming through port 150 does not pass through the evaporative cooler 120. Port 150 is similarly provided with damper 154 that can control the amount of air that flows through port 150.

Figure 2A:
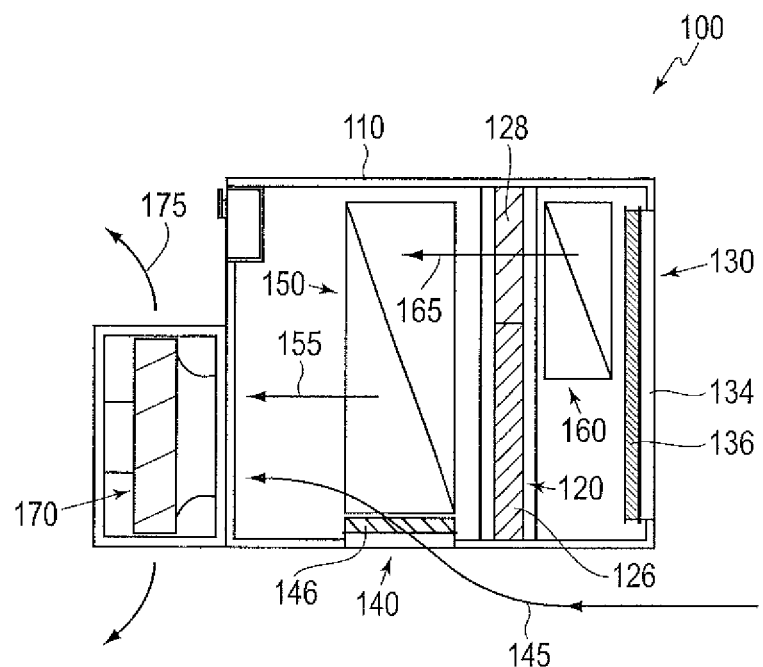
FIGS. 2A and 2B are respectively a plan view diagram and a side view diagram showing operation of an air handler in a second operation mode.

The second return air port 160 also allows recirculated air that is being returned from a conditioned space to be returned to the air handler 100. The second return air port 160 is provided on the top side of housing 110 and is positioned upstream, in an air flow direction, of evaporative cooler 120 so that air flowing through port 160 proceeds on a flow path that passes through evaporative cooler 120. Port 160 can have a smaller air entrance area than port 150. As can be seen in FIGS. 1A, 2A and 3A, the second return air port 160 has a length that is about half the width of the air handler 100, and port 150 extends across substantially the entire width of the air handler 100. The port 160 is positioned so that the center of its air entrance area is positioned proximate to one side of the air handler that is opposite the side of the air handler that includes port 140. Thus, port 160 can be positioned substantially within one half of the air handler 100 (divided along an air flow direction) and port 140 can be positioned substantially in the other half of the air handler 100. As discussed below in greater detail in connection with FIGS. 2A and 2B, positioning port 140 away from port 160 can prevent freezing of liquid in the evaporative cooler during cold ambient conditions.

Figure 5:
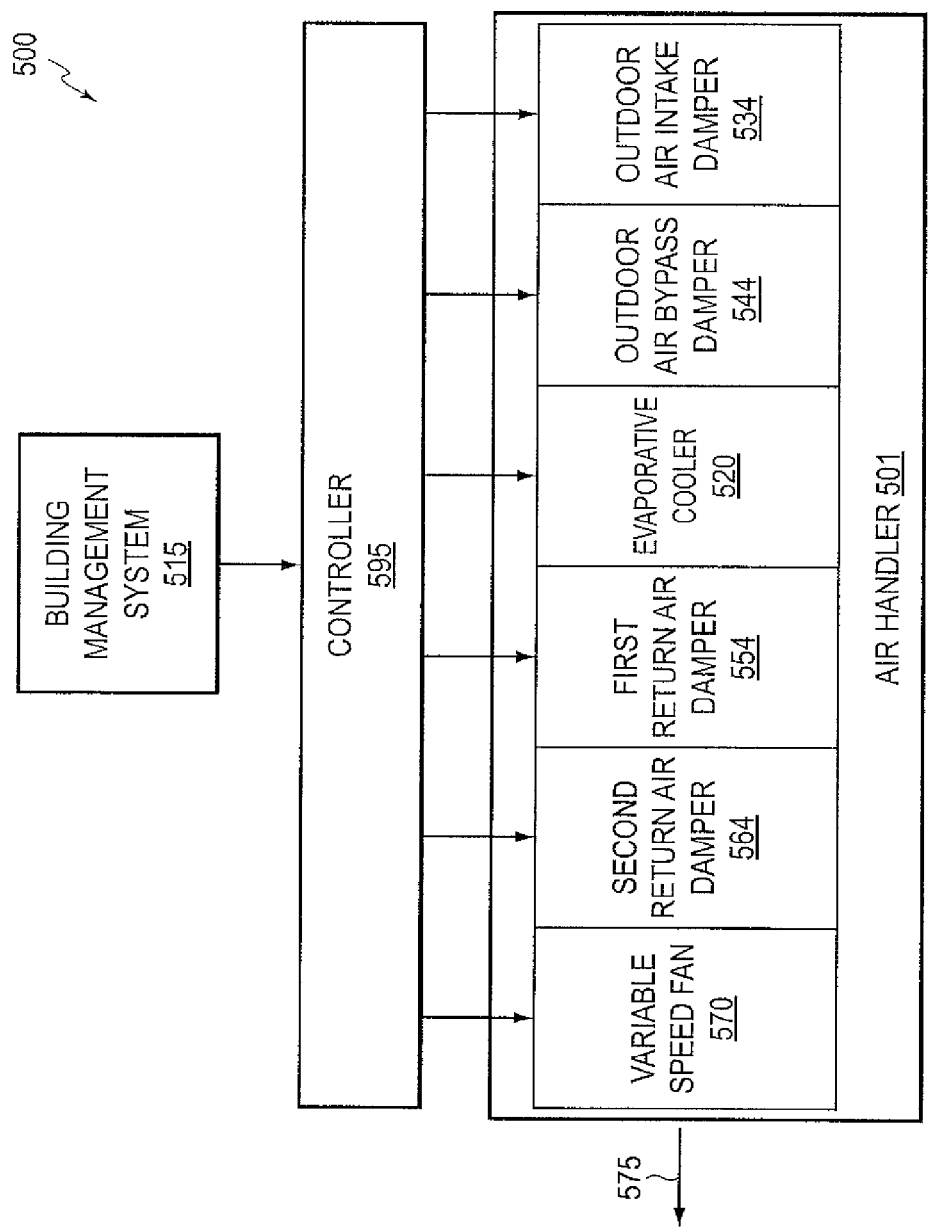
FIG. 5 is a schematic diagram illustrating the control system of the air handler.

The dampers 134, 144, 154, 164 each act as an air valve that can control the flow rate of air through the respective port. For example, many dampers have a series of blades that control the flow rate based on rotation angle of the blades. The blades can be controlled to be fully closed, fully open, or any angle in between allowing for partial flow through the port. The dampers can be open and closed by motors that are automatically controlled, e.g., by a modulating actuator, in response to signals from controller 595 (FIG. 5).

The evaporative cooler 120 can be provided with one or more cooling stages that can include evaporative cooling media. The evaporative media is typically wetted with water, and the air handler can be controlled to wet only a portion of the evaporative media depending on the operation mode. If a plurality of cooling stages are used, they can be positioned in series or parallel, and one or more of the stages can be selectively wetted depending on the operation mode. As can be seen in FIG. 1A, in this embodiment the evaporative cooler 120 includes a first cooling stage 126 that extends over more than half the width of the air handler 100, and further includes a second cooling stage 128 that extends over the remaining width of the air handler 100. The second cooling stage 128 is smaller than the first cooling stage 126. The second cooling stage 128 is positioned proximate to the second return air port 160.

The supply fan 170 is positioned at a draw-through position of the air handler 100 and operates to draw air through the open ports of the air handler and to mix different air streams before the air is supplied to the conditioned space. The fan 170 promotes mixing of the air streams and reduces air stratification so that the air entering the conditioned space is very uniform in temperature. The supply fan 170 can be a variable speed plenum fan that is controlled in response to a controller 595 (FIG. 5) to provide varying quantities of supply air depending on the needs of the conditioned space. For example, in the context of data centers, during times of higher usage the electronic equipment will generate more heat and will require more cooling air. A building management system can measure the amount of supply air that is required, e.g., based on information from air pressure sensors in the data center. The controller can adjust the speed of the supply fan 170 depending on the amount of air that is required. As an alternative or in addition to the supply fan 170, the air handler 100 can be provided with any air mixer that is sufficient to mix the different air streams entering the ports prior to being supplied to the conditioned space as supply air. Supply fan 170 may be installed internal to the housing of the air-handler or it may be external (as depicted in FIGS. 1A-3B) so as to freely discharge air directly into the room. When the fans are external to the housing of the air-handler and freely discharging into the room, the fan wheels of adjacent units may be configured to rotate opposite so as to promote better mixing of the supply air within the room.

Figure 1B:
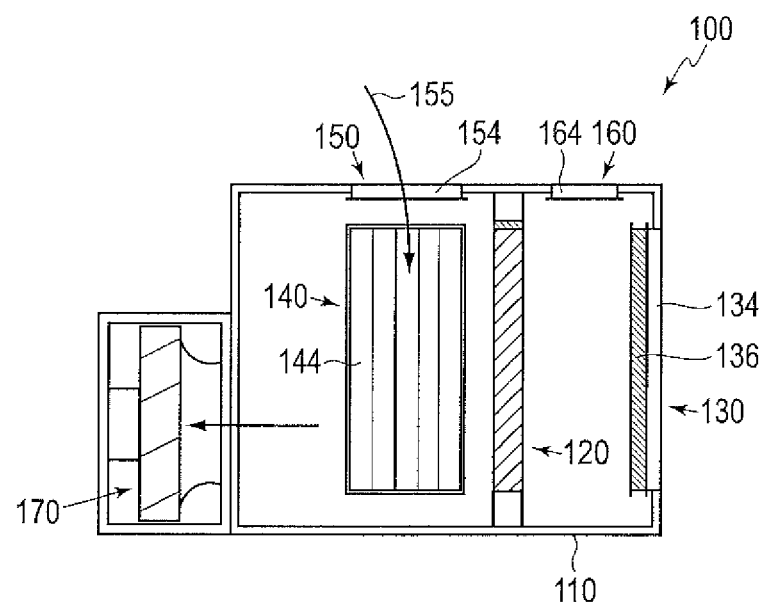

A first operation mode of the air handler 100 is illustrated in FIGS. 1A-1B that can be used for supply air temperature control when the evaporative cooler 120 is inactive. FIG. 1A is a plan view of air handler 100 and FIG. 1B is a side view of air handler 100. In the first operation mode, damper 144 is opened to allow outside air stream 145 to enter through outdoor air bypass port 140 and proceed along a flow path that does not pass through evaporative cooler 120. Damper 154 is opened and a return (or recirculation) air stream 155 enters the air handler through first return air port 150 and proceeds along a flow path that does not pass through evaporative cooler 120. The return air stream 155 mixes with outdoor air stream 145 and is further mixed by supply fan 170, which then supplies the mixed air as supply air 175 to the data center.

By modulating dampers 144 and 154, the supply air temperature can be accurately controlled by mixing different amounts of the return air and outdoor air. This mode is useful in cold conditions where the outside air is too cold to be supplied to the data center and needs to be heated, but where there may not be a need to humidify the outdoor air. In this mode, there is no need to wet the evaporative cooling media in evaporative cooler 120 and dampers 134 and 164 can be closed. If, however, the outdoor air does not need to be heated, damper 134 can be opened and the remaining dampers can be closed so that the system is operating in 100% outside air (full economizer) mode.

The use of an outdoor air bypass port 140 allows the supply fan 170 to operate using minimal power input because the fan does not need to draw as much outdoor air through the evaporative media in the evaporative cooler 120. In this regard, there is a lower pressure drop over the evaporative media, which causes the fan to use less power when it draws air though port 130.

Figure 2B:
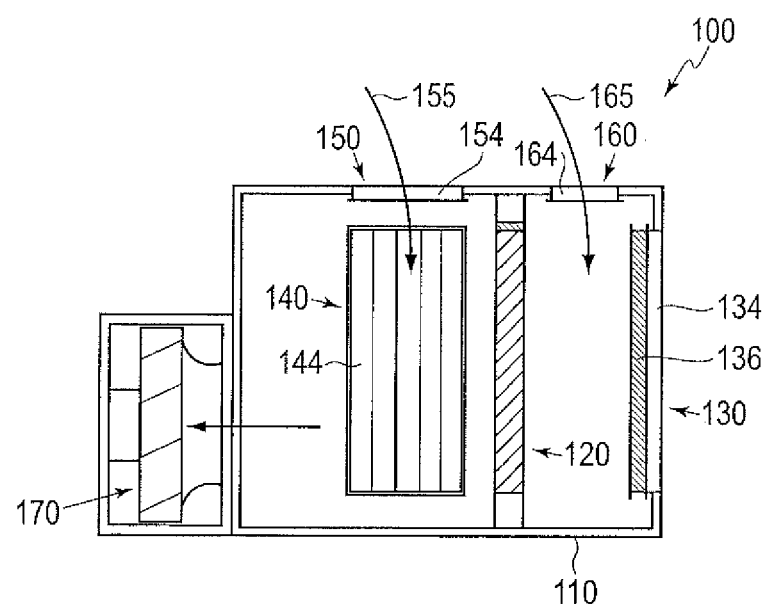
Figure 3A:
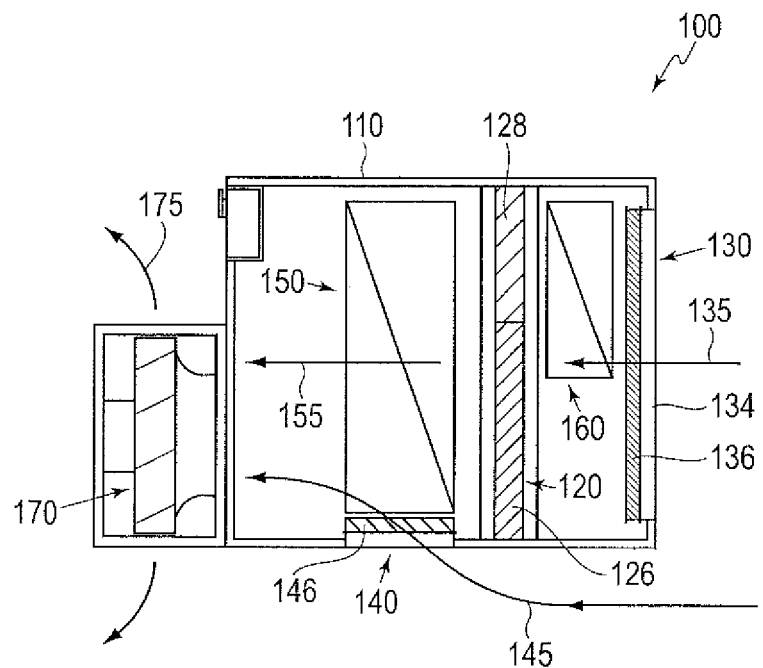
FIGS. 3A and 3B are respectively a plan view diagram and a side view diagram showing operation of an air handler in a third operation mode.

A second operation mode of the air handler 100 is illustrated in FIGS. 2A-2B that can be used for supply air temperature and humidity control when the evaporative cooler 120 is active. FIG. 2A is a plan view of air handler 100 and FIG. 2B is a side view of air handler 100. Similar to the first mode, damper 144 is opened to allow outside air stream 145 to enter through outdoor air bypass port 140 and proceed along a flow path that does not pass through evaporative cooler 120. Damper 154 can be opened to allow return air stream 155 to enter the air handler through first return air port 150 and proceed along a flow path that does not pass through evaporative cooler 120. In the second mode, at least the media in the second cooling stage 128 is wetted, and damper 164 is opened to allow return air stream 165 to enter port 160 and pass through at least the activated second cooling stage 128 of evaporative cooler 120. As return air stream 165 passes through the wetted media its dry bulb temperature is lowered and the air stream is humidified. The air streams 145, 155, and 165 are mixed downstream of the evaporative cooler 120 and further mixed by supply fan 170, which then supplies the mixed air to the data center.

By modulating dampers 144, 154, and 164 the supply air temperature and humidity can be accurately controlled by mixing the relatively hotter return air stream 155, the humidified and cooled return air 165, and the cooler outdoor air stream 145. This mode is useful in severe winter conditions where the outdoor air is very cold (particularly below freezing) and has low absolute moisture content. In this regard, in conventional designs, it is difficult to humidify the supply air when the outdoor air is very cold because passing the outdoor air over the wetted media would result in freezing of the water on the media. Some conventional approaches to this problem include preheating the outdoor air before it passes through the evaporative media. By providing a second return air port 160 upstream of the evaporative cooler 120, water can be added to the supply air by humidifying the relatively warmer return air.

In this embodiment, only the second stage 128 of the evaporative cooler 120 is wetted, which is positioned on the side of the air handler 100 that is opposite port 140 to prevent the cold outdoor air from freezing the wetted media. Accordingly, as can be seen in FIG. 2A, the second return air port 160 can be positioned substantially at one side of the air handler 100 so that the return air stream 165 passes through the wetted second stage 128 while the cold outdoor air stream 145 only mixes with return air downstream of evaporative cooler 120.

There is no need to wet the first stage 126 of the evaporative cooler 120 in this mode and damper 134 can be closed.

Figure 3B:
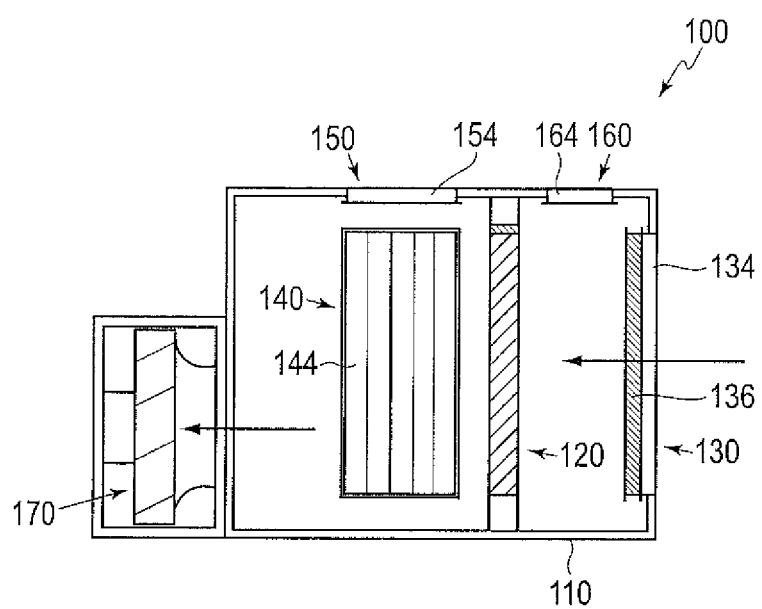

A third operation mode of the air handler 100 is illustrated in FIGS. 3A-3B that can be used for supply air temperature and humidity control when the evaporative cooler 120 is active. FIG. 3A is a plan view of air handler 100 and FIG. 3B is a side view of air handler 100. Damper 144 is opened to allow outside air stream 145 to enter through outdoor air bypass port 140 and proceed along a flow path that does not pass through evaporative cooler 120. In the third mode, the first cooling stage 126 and the second cooling stage 128 can be wetted, and damper 134 is opened to allow outdoor air stream 135 to enter port 130 and pass through the activated evaporative cooler 120. Optionally, only one of the cooling stages can be wetted. As outdoor air stream 135 passes through the wetted media its dry bulb temperature is lowered and the air stream is humidified. The air streams 135 and 145 are mixed downstream of the evaporative cooler 120 and then further mixed by supply fan 170, which supplies supply air 175 to the data center.

By modulating dampers 134 and 144, the supply air temperature can be accurately controlled by mixing the relatively cooler and more humid air that passes through the evaporative cooler 120 with the outdoor air stream 145 that bypasses the evaporative cooler 120. This mode is useful in warmer weather conditions where the outdoor air temperature is hotter than the desired supply air temperature. In conventional designs that do not mix the bypass outdoor air, the temperature and humidity of the supply air can be difficult to control in warm conditions because the direct evaporative cooler can reduce the temperature beyond the desired temperature and increase the humidity beyond the desired humidity. In this embodiment of the invention, the outdoor air can be cooled with the direct evaporative media, while the temperature can be accurately controlled by mixing in the relatively dryer and warmer bypass air. The cooling may be restricted so as to limit the humidity of the supply air.

Figure 4:
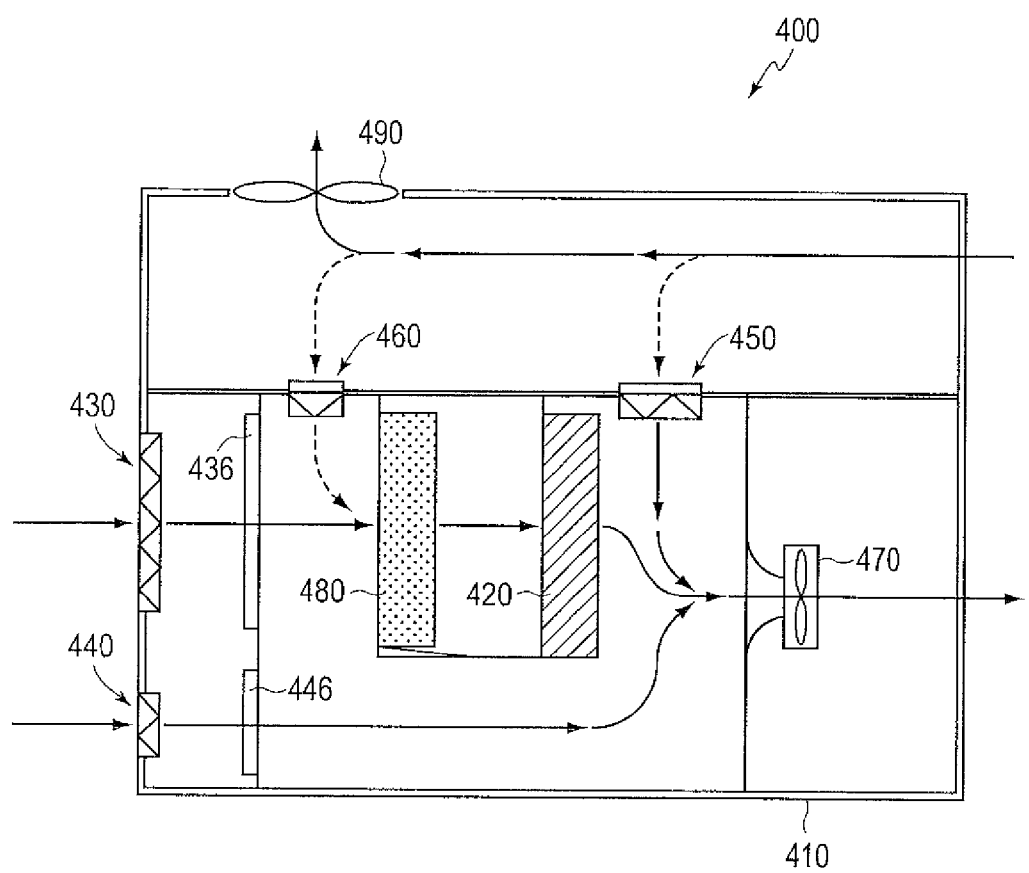
FIG. 4 is a side view cross-sectional diagram of another air handler.

FIG. 4 illustrates another embodiment of an air handler 400. The air handler 400 includes similar features, including a housing 410, evaporative cooler 420 that is provided within housing 410, outdoor air intake port 430 formed on a rear face on the upstream side of air handler 400, outdoor air bypass port 440, first return air port 450 formed on the top side of air handler 400, second return air port 460 formed on the top side of air handler 400, and supply fan 470 that is positioned at a downstream draw-through position of the air handler 400. The ports 430, 440, 450, and 460 are provided with dampers that can be automatically controlled. Air filters 436, 446 are used to filter the air that respectively enters through the outdoor air intake port 430 and the outdoor air bypass port 440.

In this embodiment, the outdoor air bypass port 440 is positioned on the rear face of the air handler 400 and similarly directs the air in a path that does not pass through the evaporative cooler 420. A mechanical cooling coil 480 is arranged upstream of the evaporative cooler 420 in series, which can provide additional cooling to the outdoor air if needed. In this embodiment, exhaust fan 490 is illustrated, which can exhaust all or a portion of the return air to the outdoors.

FIG. 5 is a schematic diagram illustrating a control system 500 for controlling air handler 501 with controller 595. In particular, the controller 595 sends control signals to control the outdoor air intake damper 534, outdoor air bypass damper 544, first return air damper 554, and second return air damper 564. As indicated above, the controller can control the operating mode of the air handler 501, and can independently control each of the dampers to modulate the air flow that enters each port of the air handler 501. The controller 595 can also send control signals to control the speed of variable speed fan 570 depending on how much supply air 575 is required. The controller 595 can also send control signals to control the evaporative cooler so that that the cooler (or particular cooling stages or portions of the cooler) are wetted during different operating modes.

The controller 595 determines the output control signals based on information it receives from building management system 515, or directly from externally mounted temperature, pressure, or power sensing devices. The building management system 515 transmits data from various sensors that can measure pressure and temperature conditions in the conditioned indoor space and outdoor ambient conditions.

Although the disclosed devices, systems and methods have been described in conjunction with exemplary embodiments, these embodiments should be viewed as illustrative, not limiting. Various modifications, combinations, substitutes, or the like are available within the spirit and scope of the disclosed devices, methods and systems.

What is claimed is:

1. A direct evaporative air handler for conditioning an enclosed space with supply air, the air handler comprising:
    a direct evaporative cooler;
    an outdoor air port positioned upstream of the evaporative cooler in an air flow direction, the outdoor air port being configured to allow outdoor air to enter the air handler;
    a return air port positioned upstream of the evaporative cooler in an air flow direction, the return air port being configured to allow recirculated air from the enclosed space to enter the air handler; and
    an outdoor air bypass port that is configured to allow outdoor air to enter the air handler at a position where the outdoor air entering the bypass port will not pass through the evaporative cooler,
    wherein the air handler is configured so that outdoor air entering the air handler through the outdoor air port passes through the evaporative cooler, and the recirculated air entering the air handler through the return air port passes through the evaporative cooler.

2. The direct evaporative air handler according to claim 1, wherein each of the outdoor air port, the outdoor air bypass port, and the return port includes a damper that selectively allows a quantity of air to enter the air handler.

3. The direct evaporative air handler according to claim 2, wherein each of the dampers is configured to be modulated in response to control signals.

4. The direct evaporative air handler according to claim 1, further comprising an air mixer positioned downstream of the evaporative cooler.

5. The direct evaporative air handler according to claim 4, wherein the air mixer is a supply fan that is configured to draw air into the air handler, mix the air, and provide the mixed air as the supply air.

6. The direct evaporative air handler according to claim 5, wherein the supply fan is a variable speed fan that is configured to change speeds in response to a control signal.

7. The direct evaporative air handler according to claim 1, wherein the evaporative cooler includes a plurality of cooling stages that can each be selectively wetted in response to a control signal.

8. The direct evaporative air handler according to claim 7, wherein one of the plurality of cooling stages is arranged to receive air that enters the air handler through the return air port.

9. A direct evaporative air handler for conditioning an enclosed space with supply air, the air handler comprising:
    a direct evaporative cooler;
    an outdoor air port positioned upstream of the evaporative cooler in an air flow direction, the outdoor air port being configured to selectively allow outdoor air to enter the air handler and proceed on a flow path that passes through the evaporative cooler;
    an outdoor air bypass port that is configured to selectively allow outdoor air to enter the air handler and proceed on a flow path that does not pass through the evaporative cooler;
    a first return air port that is configured to selectively allow recirculated air from the enclosed space to enter the air handler and proceed on a flow path that does not pass through the evaporative cooler;
    a second return air port positioned upstream of the evaporative cooler in an air flow direction, the second return air port being configured to selectively allow recirculated air from the enclosed space to enter the air handler and proceed on a flow path that passes through the evaporative cooler; and
    a supply fan positioned downstream of the evaporative cooler that is configured to draw air through the outdoor air port, outdoor air bypass port, first return air port, and second return air port, wherein the supply fan is configured to mix air in the air handler and provide the mixed air as the supply air.

10. The direct evaporative air handler of claim 9, wherein each of the outdoor air port, the outdoor air bypass port, the first return port and the second return port includes a damper that selectively allows a quantity of air to enter the air handler and can be modulated in response to a control signal.

11. The direct evaporative air handler of claim 10, wherein the supply fan is a variable speed supply fan that is configured to change speeds in response to a control signal.

12. The direct evaporative air handler of claim 9, wherein the second return air port has an air entrance area that is smaller than an air entrance area of the first return air port.

13. The direct evaporative air handler of claim 12, wherein the center of the air entrance area of the second return air port is positioned at or proximate to one side of the air handler, and the center of an air entrance area of the outdoor air bypass port is positioned at or proximate to another side of the air handler that is opposite the one side.

14. A method of operating the direct evaporative air handler of claim 9, the method comprising:
    wetting at least a portion of the evaporative cooler;
    drawing recirculated air through the second return air port into the air handler and passing it through the wetted evaporative cooler while drawing outdoor air through the outdoor air bypass port into the air handler;
    mixing the recirculated air that is passed through the evaporative cooler with the air that is drawn through the outdoor air bypass port; and
    providing the mixed air as the supply air.

15. The method of claim 14, further comprising drawing recirculated air through the first return air port into the air handler while recirculated air is drawn through the second return air port and while outdoor air is drawn through the outdoor air bypass port.

16. The method of claim 14, wherein the outdoor air port is closed while recirculated air is drawn through the second return air port and while outdoor air is drawn through the outdoor air bypass port.

17. The method of claim 14, wherein the temperature of the outdoor air that is drawn through the outdoor air bypass port is below the freezing temperature of water.

18. The method of claim 15, further comprising controlling the temperature and relative humidity of the supply air to be at predetermined levels by (i) controlling the amount of recirculated air that is drawn through the second return air port, (ii) controlling the amount of outdoor air that is drawn through the outdoor air bypass port, and (iii) controlling the amount of recirculated air that is drawn through the first return air port.

19. A method of operating the direct evaporative air handler of claim 9, the method comprising:
- drawing recirculated air through the first return air port into the air handler while drawing outdoor air through the outdoor air bypass port into the air handler;
- closing the outdoor air port and the second return air port so that air does not pass through the evaporative cooler while recirculated air is drawn through the first return air port and while outdoor air is drawn through the outdoor air bypass port;
- mixing the air that is drawn through the first return air port with the air that is drawn through the outdoor air bypass port; and
- providing the mixed air as the supply air.

20. The method of claim 19, wherein the temperature of the outdoor air that is drawn through the outdoor air bypass port is below the temperature of the recirculated air that is drawn through the first return air port.

21. The method of claim 19, further comprising controlling the temperature of the supply air to be at a predetermined level by (i) controlling the amount of recirculated air that is drawn through the first return air port, and (ii) controlling the amount of outdoor air that is drawn through the outdoor air bypass port.

22. A method of operating the direct evaporative air handler of claim 9, the method comprising:
- wetting at least a portion of the evaporative cooler;
- drawing outdoor air through the outdoor air port into the air handler and passing it through the wetted evaporative cooler while drawing outdoor air through the outdoor air bypass port into the air handler;
- mixing the outdoor air that is passed through the evaporative cooler with the air that is drawn through the outdoor air bypass port; and
- providing the mixed air as the supply air.

23. The method of claim 22, wherein the temperature of the outdoor air is higher than the temperature of the supply air.

24. The method of claim 22, further comprising controlling the temperature and humidity of the supply air to be at predetermined levels by (i) controlling the amount of outdoor air that is drawn through the outdoor air port, and (ii) controlling the amount of outdoor air that is drawn through the outdoor air bypass port.

* * * * *